United States Patent Office 3,634,384
Patented Jan. 11, 1972

3,634,384
POLYMERIZATION CATALYSTS
Ermanno Susa and Adolfo Mayr, Ferrara, Italy, assignors to the B. F. Goodrich Company, Akron, Ohio
No Drawing. Filed May 5, 1969, Ser. No. 821,963
Claims priority, application Italy, May 6, 1968, 16,141/68
Int. Cl. C08f 1/56, 3/06
U.S. Cl. 260—94.9   15 Claims

ABSTRACT OF THE DISCLOSURE

There are disclosed novel polymerization catalysts prepared by reacting magnesium hydroxychloride with a hydrocarbon-soluble complex of a titanium or vanadium tetrahalide with an alkyl aluminum compound such as aluminum trialkyl or dialkyl aluminum halide, and then mixing the reaction product with an organometallic compound or hydride of a Group I to III metal. The catalysts are particularly effective in the polymerization of ethylene to the homoploymer, polyethylene, and in the copolymerization of ethylene with propylene or other higher alpha-olefins, and/or with diolefins.

PRIOR ART

Ethylene has been homopolymerized, and copolymerized with other monomers, by means of various catalysts of different types. One of the best known and most effective catalyst is prepared from a transition metal compound and a compound of a metal belonging to Group I to III of the Mendelyeev Periodic Table.

Catalysts particularly active in the polymerization and copolymerization of ethylene are obtained, according to French Pat. No. 1,375,127 and British Pats. Nos. 1,085,679 and 1,095,110 by reacting a transition metal compound, in particular titanium tetrachloride, with a solid carrier consisting of a hydroxychloride of a bivalent metal, more especially magnesium hydroxychloride, and then activating the resulting reaction product by means of an organometallic compound of a Group I to III metal.

In the catalysts prepared by the process of said prior art, the titanium compound is chemically bound to the carrier through an oxygen bridge which forms in consequence of a reaction which may be represented as follows [in terms of $TiCl_4$ and $Mg(OH)Cl$ as the starting materials]:

$$TiCl_4 + Mg(OH)Cl \rightarrow TiCl_3-O-MgCl + HCl$$

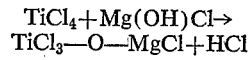

As is apparent from the prior art patents mentioned, rather vigorous conditions are required for this reaction to occur. In particular, relatively high temperatures comprised between about 80° C. and 180° C. must be used. Furthermore, it is necessary to operate in the presence of a considerable excess of $TiCl_4$, mainly for removing undesired by-products formed in the course of the reaction and which are soluble in the excess $TiCl_4$. The by-products, which consist prevailingly of titanium oxychloride, have only slight catalytic activity and exert a negative influence on the characteristics of the final polymers obtained, if allowed to remain with the catalyst and not dissolved out as formed.

These by-products are always formed when the supported catalytic component is prepared by starting with a transition metal halide such as titanium tetrachloride and reacting said halide with the bivalent metal hydroxychloride, as described in the aforementioned patents.

THE PRESENT INVENTION

It has been found possible, in accordance with this invention, to prepare catalytic components supported on magnesium hydroxychloride starting with titanium or vanadium compounds different from those of the prior art, without the simultaneous formation of by-products which are detrimental to the polymerization and/or to the properties of the polymers obtained by use of the final catalysts, and without the use of excess titanium or vanadium compound.

The titanium or vanadium compound used as starting reactant in the preparation of our new supported catalyst-forming component is a hydrocarbon soluble complex of a titanium or vanadium tetrahalide and an alkyl aluminum compound of the formula $$AlR_mX_n$$ 

in which H is a hydrocarbon radical, more specifically and alkyl group containing 2 to 8 carbon atoms; $m$ is a whole number from 1 to 3; X is Cl, Br or I, and $n$ is a whole number from 0 to 2.

The hydrocarbon-soluble titanium or vanadium complex can be prepared by processes similar to those described in J. Polymer Science, 37, 561, 1959 for the complex of $TiCl_4$ with $AlR_3$. Thus, the complex can be prepared by reacting the titanium or vanadium halide with the selected alkyl aluminum compound at low temperatures such that substantially no decomposition of the complex occurs, and using a Ti/Al or V/Al molar ratio of from 0.5:1 to 2:1.

In preparing a $TiCl_4/Al$ trialkyl or dialkyl Al monochloride complex, it is preferable to operate at a temperature of from −30° C. to −78° C. and with a Ti/Al molar ratio of 1:1.

The useful titanium or vanadium halides are the tetrachlorides, tetrabromides or tetraiodides of the metals.

Particularly suitable organometallic compounds for use in preparing the complexes include aluminum trialkyls, such as aluminum triethyl, aluminum triisobutyl, aluminum triisohexyl, and the dialkyl aluminum halides $R_2AlX$, in which R is an alkyl radical and X is Cl, Br or I, and more particularly diethyl aluminum chloride.

The reaction between the soluble complex and solid magnesium hydroxychloride is also conducted at relatively low temperature, generally below 0° C., at which there is no substantial decomposition of the complex. The preferred reaction temperatures are in the range −30° C. to −78° C.

The magnesium hydroxychloride is reacted with the complex in suspension in an inert solvent, more particularly an aliphatic hydrocarbon such as n-heptane.

The amount of the soluble titanium or vanadium complex used corresponds exactly to the amount of titanium or vanadium to be fixed on the carrier. In general, this amount is from 0.1% to say, 3 to 4% by weight of the meal titanium or of the metal vanadium.

Our new catalyst-forming component which is formed in the reaction between the magnesium hydroxychloride and the soluble titanium or vanadium complex differs from the prior art catalyst-forming components utilizing Mg(OH)Ci as support, in that our component contains, in addition to titanium or vanadium, aluminum in substantially the same ratio to Ti or V as was used in preparing the soluble complex.

By mixing the reaction product of the magnesium hydroxychloride and the soluble complex with an organometallic compound or hydride of a metal belonging to Groups I, II or III of the Mendelyeev Periodic Table, we obtain a final polymerization catalyst which is very active in the polymerization of olefins, and particularly in the homo- and copolymerization of ethylene.

The organometallic compounds which can be mixed with the catalyst-forming component comprised of the product of reaction between Mg(OH)Cl and the soluble titanium or vanadium complex, to obtain the final polymerization catalyst according to this invention, include triethyl aluminum, diethyl aluminum chloride, triisobutyl aluminum, diisobutyl aluminum chloride, diethyl aluminum hydride, diisobutyl aluminum hydride, diethyl aluminum bromide, diethyl beryllium, and so on.

The molar ratio between the organometallic compound or hydride and the transition metal in the other catalyst-forming component is not critical and may be varied within wide limits; it may be, for instance, between 1 and 1,000.

The polymerization of ethylene or of ethylene-containing mixtures with the aid of these new catalysts can be carried out in liquid phase, in the presence or absence of a polymerization diluent, or in the gaseous phase.

The polymerization temperature may be between $-80°$ C. and 200° C. Preferably, it is comprised between 50° C. and 100° C. The polymerization can be performed at atmospheric pressure or at increased pressure.

The molecular weight of the polymer formed can be regulated by known methods, as by including such molecular-weight controlling agents as hydrogen, alkyl halides, or halides or organometallic compounds of zinc or cadmium in the polymerization zone.

As we have indicated, an important advantage of the present invention resides in the possibility of supporting a titanium or vanadium halide on a magnesium hydroxyhalide without having to use large amounts of the titanium or vanadium compound per se, over and above what is to be fixed on the carrier. Another important advantage is that at the end of the reaction between the carrier and the titanium or vanadium complex, the reaction product does not require washing for the elimination of unreacted transition metal compound and/or undesired by-products, such as is required in the prior art procedures discussed herein.

The following examples are given to illustrate the invention in greater detail, and are not limiting.

EXAMPLE 1

To a solution of 0.0897 g. of $TiCl_4$ in 60 cc. of n-heptane, brought to a temperature of $-78°$ C. by means of Dry Ice, was added under stirring 0.175 g. of Al triisohexyl dissolved in 40 cc. of n-heptane, also kept at $-78°$ C.

Once the addition was completed, there were introduced, still at $-78°$ C., 8.74 g. of Mg(OH)Cl suspended in 10 cc. of n-heptane kept at $-78°$ C. Thereupon, the temperature was allowed to rise to room temperature. The mixture was filtered through a porous plate in a nitrogen atmosphere and then dried under vacuum.

In the product thus obtained were present in percent by weight: $Ti^{+++}$ 0.05, total Ti=0.26, Al=0.13.

EXAMPLE 2

Under the same conditions as those described in Example 1, 0.0897 g. of $TiCl_4$ was reacted with 0.0905 g. of Al triisobutyl and 5.849 g. of Mg(OH)Cl. The solid thus obtained contained a total of 0.27% of Ti by weight.

EXAMPLE 3

Operating as described in Example 1, 0.0877 g. of $TiCl_4$ was reacted with 0.0570 g. of $Al(C_2H_5)_2Cl$ and 7.90 g. of Mg(OH)Cl.

In the product thus obtained were present, $$Ti^{+++}=0.05\%$$

total Ti=0.15%, Al=0.19%.

EXAMPLE 4

Under the same conditions as those described in Example 1, 0.0897 g. of $TiCl_4$ was reacted with 0.030 g. of Al triethyl and 5.60 g. of Mg(OH)Cl.

The solid thus obtained had a total Ti content of 0.3% by weight.

EXAMPLE 5

Under the same conditions as those of Example 1, 0.01 g. of $TiCl_4$ was reacted with 0.508 g. of Mg(OH)Cl.

EXAMPLE 6

Under the same conditions as those of Example 1, 0.089 g. of $TiCl_4$ was reacted with 0.03 g. of Al triisohexyl.

EXAMPLE 7

Under the same conditions as those of Example 1, 0.2370 g. of $TiCl_4$ was reacted with 0.0556 g. of Al triethyl and 6.080 g. of Mg(OH)Cl.

In the product thus obtained the total Ti equalled 0.25% by weight.

EXAMPLE 8

Into a stainless steel autoclave of 1.8 liters holding capacity, degassed with nitrogen, and containing 1000 cc. of n-heptane, was introduced 1 g. of Al triisobutyl. This mixture was then brought up to a temperature of 75° C. Thereupon, there was added 0.6687 g. of the catalytic component prepared according to Example 1, suspended in 50 cc. of n-heptane. Immediately thereafter were introduced 3 atm. of hydrogen and then 10 atms. of ethylene.

Thereby the temperature rose to 85° C. and the pressure was maintained constant by continuously feeding further amounts of ethylene.

In this way there were obtained 236 g. of a polyethylene having an [$\eta$] (intrinsic viscosity determined at 135° C. in tetralin), equal to 3.1 dl./g. The yield in polymer amounted to 136,000 g./g. of Ti.

EXAMPLE 9

The same procedures as in Example 8 were followed.

As catalyst were used 0.2994 g. of the catalytic component prepared according to Example 2, and 1 g. of Al triisobutyl.

There were obtained 385 g. of polymer having an [$\eta$] (determined in tetraline at 135° C.) equal to 2.7 dl./g.

The yield in polymer amounted to 480,000 g./g. of Ti.

EXAMPLE 10

The same procedures were followed as in Example 8, using as a catalyst 0.4493 g. of the product obtained according to Example 3, and 1 g. of Al-tri-isobutyl.

The contact time amounted to 6.5 hours. There were obtained 415 g. of polyethylene with an [$\eta$] (determined in tetraline at 135° C.) equal to 2 dl./g. The yield in polymer amounted to 616,000 g./g. Ti.

EXAMPLE 11

The same procedures were followed as in Example 8, using as a catalyst 0.3556 g. of the product obtained according to Example 4, and 1 g. of Al-triethyl. The contact time was 3 hours. There were obtained 212 g. of polymer. The yield in polymer amounted to 147,500 g./g. Ti.

EXAMPLE 12

The same procedures were followed as in Example 8, using as a catalyst 0.508 g. of the product obtained according to Example 5, and 1 g. of Al-triethyl. The contact time amounted to 4 hours. There was no formation of polymer.

EXAMPLE 13

The same procedures were followed as in Example 8, using the catalyst prepared according to Example 6. There were obtained 4.5 g. of polymer.

EXAMPLE 14

The same procedure was followed as in Example 8, with the only difference that into the autoclave were introduced 100 cc. of n-heptane instead of 1000 cc.

The contact time lasted 6 hours. After which were obtained 190 g. of polyethylene with an $[\eta]$ (determined in tetraline at 135° C.) equal to 3.1 dl./g. The content in Ti of the polymer was 0.00096 g. The yield amounted to 198,000 g./g. of Ti.

EXAMPLE 15

In this case again were followed the same procedure as in Example 8, using as a catalyst 0.4320 g. of the product obtained according to Example 7, and 1.5 g. of Al-triisobutyl. Into the autoclave were introduced 1100 cc. of n-heptane.

After 2 hours of reaction, there were obtained 25 g. of polyethylene with an $[\eta]$ (determined on tetraline at 135° C.) equal to 2.8 dl./g. The contents in Ti of the polymer amounted to 0.00108 g. The yield was 23,000 g./g. of Ti.

EXAMPLE 16

Into a stainless steel autoclave of 2 litre capacity, degassed with nitrogen and cooled through the expansion of the liquid propylene used in the reaction, were introduced 825 cc. of propylene and 40 cc. of ethylidene-norbornene. The temperature was brought up to —10° C. and the whole was saturated with ethylene up to an overpressure of 1.5 atm. of ethylene.

Thereupon, there were introduced 1 g. of $Al(C_2H_5)Cl$ and the product obtained by reacting, according to the technique indicated in Example 1, 0.022 g. of $VCl_4$ with 0.138 g. of $Al(C_2H_5)Cl$ and 0.3 g. of $Mg(OH)Cl$.

The pressure was maintained constant throughout by the addition of ethylene. After 150 minutes, the suspension was discharged and from it were separated the unreacted monomers by using vapor stripping.

Thereby were obtained 107 g. of terpolymer having the following characteristics:

$[\eta]$ (determined in tetraline at tetraline at 135° C.)=5.4 dl./g.

The contents in propylene amounted to 40% by weight; the contents in ethylidene-norbornene amounts to 1% by weight. The yield in polymer amounted to 38,000 g./g. of vanadium.

Some changes in details may be made in practicing the invention, without departing from the spirit thereof Therefore, we intend to include in the scope of the appended claims all such modifications and variations as will be obvious to those skilled in the art from the description and illustrative working examples given herein.

We claim:

1. A polymerization catalyst prepared by mixing (1) an organometallic compound or hydride of a metal belonging to Groups I to III inclusive of the Mendelyeev Periodic Table with (2) the product consisting of the product of reaction between (a) a solid carrier comprising magnesium hydroxychloride and (b) a hydrocarbon-soluble complex of a titanium or vanadium tetrahalide with an alkyl aluminum compound $AlR_mX_n$, in which R is a hydrocarbon radical, X is Cl, Br or I, $m$ is a whole number from 1 to 3, and $n$ is a whole number from 0 to 2, said hydrocarbon-soluble complex being prepared at a temperature below —30° C. and having a Ti/Al or V/Al molar ratio of from 0.5:1 to 2:1, and said reaction product (2) being formed at a temperature below 0° C. and at which there is no substantial decomposition of the hydrocarbon-soluble complex and no substantial formation of a precipitate.

2. A polymerization catalyst according to claim 1, characterized in that the reaction product (2) is prepared by reacting magnesium hydroxychloride, in suspension in a hydrocarbon solvent, with a complex prepared by reacting vanadium tetrachloride with an alkyl aluminum compound selected from the group consisting of aluminum triethyl, aluminum triisobutyl, aluminum triisohexyl, and diethyl aluminum chloride, at a temperature below —30° C., and in relative proportions such that the V/Al molar ratio is from 0.5:1 to 2:1.

3. A catalyst according to claim 1, characterized in that the catalyst-forming component (1) is selected from the group consisting of aluminum triethyl, aluminum triisobutyl, and diethyl aluminum chloride.

4. A polymerization catalyst according to claim 1, characterized in that the reaction product (2) is obtained by reacting the hydrocarbon-soluble complex with the solid carrier at a temperature of from —30° C. to —78° C.

5. A polymerization catalyst according to claim 1, characterized in that the hydrocarbon-soluble complex is prepared at a temperature of from —30° C. to —78° C.

6. A polymerization catalyst according to claim 1, characterized in that the hydrocarbon-soluble complex is prepared at a temperature of from —30° C. to —78° C., and the reaction product (2) is obtained by reacting the hydrocarbon-soluble complex with the solid carrier at a temperature of from —30° C. to —78° C.

7. A polymerization catalyst according to claim 1, characterized in that reaction product (2) is prepared by reacting magnesium hydroxychloride, in suspension in a hydrocarbon solvent, with a complex prepared by reacting titanium tetrachloride and an alkyl aluminum compound selected from the group consisting of aluminum triethyl, aluminum triisobutyl, aluminum triisohexyl, and diethyl aluminum chloride, at a temperature below —30° C., and in relative proportions such that the Ti/Al molar ratio is from 0.5:1 to 2:1.

8. A polymerization catalyst according to claim 7, characterized in that the catalyst-forming component (1) is selected from the group consisting of aluminum triethyl, aluminum triisobutyl, and diethyl aluminum chloride.

9. A polymerization catalyst according to claim 7, characterized in that after the reaction at the temperature below —30° C., the temperature is permitted to rise to room temperature.

10. A polymerization catalyst according to claim 9, characterized in that the catalyst-forming component (1) is selected from the group consisting of aluminum triethyl, aluminum triisobutyl, and diethyl aluminum chloride.

11. A process for polymerizing ethylene and mixtures of ethylene with other olefins, which comprises polymerizing the monomer or monomer mixture in contact with a catalyst prepared by mixing (1) an organometallic compound or hydride of a metal belonging to Groups I, II or III of the Mendelyeev Periodic Table with (2) the product of reaction between a solid carrier comprising magnesium hydroxychloride and a hydrocarbon-soluble complex of a titanium or vanadium tetrahalide with an alkyl aluminum compound $AlR_mX_n$, in which R is a hydrocarbon radical, X is Cl, Br or I, $m$ is a whole number from 1 to 3, and $n$ is a whole number from 0 to 2, which hydrocarbon-soluble complex is prepared at a temperature below —30° C. and has a Ti/Al or V/Al molar ratio of from 0.5:1 to 2:1, and said reaction product (2) being formed at a temperature below 0° C. and at which there is no substantial decomposition of the hydrocarbon-soluble complex and no substantial formation of a precipitate.

12. The process according to claim 11, characterized in that ethylene is polymerized in contact with the polymerization catalyst at a temperature of from −30° C. to 200° C.

13. The process according to claim 11, characterized in that the polymerization is carried out in an inert polymerization solvent.

14. The process according to claim 11, characterized in that the polymerization is carried out in the absence of an extraneous polymerization solvent.

15. The process according to claim 11, characterized in that a mixture of ethylene and another olefin is copolymerized in contact with the polymerization catalyst at a temperature below 0° C. and in the absence of an extraneous polymerization solvent.

References Cited

UNITED STATES PATENTS

| 3,400,110 | 9/1968 | Dassesse et al. | 260—88.2 |
| 3,454,547 | 7/1969 | Delbouille et al. | 260—94.9 |

FOREIGN PATENTS

| 1,095,110 | 12/1967 | Great Britain. |

JOSEPH L. SCHOFER, Primary Examiner

E. J. SMITH, Assistant Examiner

U.S. Cl. X.R.

252—429 C; 260—88.2, 80.78